United States Patent
Lazzarin et al.

(10) Patent No.: US 8,939,678 B2
(45) Date of Patent: Jan. 27, 2015

(54) METHOD AND SYSTEM OF LAYING UNDERWATER PIPELINES IN THE BED OF A BODY OF WATER

(75) Inventors: Diego Lazzarin, Treviso (IT); Massimo Fontolan, Zero Branco (IT)

(73) Assignee: Saipem S.p.A., San Donato Milanese (IT)

( * ) Notice: Subject to any disclaimer, the term of this patent is extended or adjusted under 35 U.S.C. 154(b) by 619 days.

(21) Appl. No.: 12/994,438

(22) PCT Filed: May 20, 2009

(86) PCT No.: PCT/EP2009/056192
§ 371 (c)(1),
(2), (4) Date: May 17, 2011

(87) PCT Pub. No.: WO2009/141409
PCT Pub. Date: Nov. 26, 2009

(65) Prior Publication Data
US 2011/0211913 A1 Sep. 1, 2011

(30) Foreign Application Priority Data
May 23, 2008 (IT) .............................. MI2008A0964

(51) Int. Cl.
*F16L 1/12* (2006.01)
*E02F 5/10* (2006.01)
(Continued)

(52) U.S. Cl.
CPC . *E02F 5/105* (2013.01); *E02F 5/04* (2013.01); *E02F 5/107* (2013.01); *E02F 5/109* (2013.01); *E02F 5/14* (2013.01); *E02F 9/2866* (2013.01); *F16L 1/028* (2013.01); *F16L 1/16* (2013.01)

USPC ........... 405/163; 405/158; 405/159; 405/161; 37/321; 37/322

(58) Field of Classification Search
CPC ............. E02F 5/105; E02F 5/04; E02F 5/107; E02F 5/109; F16L 1/028; F16L 1/16
USPC ............ 405/158, 159, 161, 163, 166; 37/307, 37/321, 322, 326, 366, 367
See application file for complete search history.

(56) References Cited

U.S. PATENT DOCUMENTS 4,114,390 A * 9/1978 Van Steveninck et al. ... 405/163
4,395,158 A   7/1983 Brooks
(Continued)

FOREIGN PATENT DOCUMENTS

EP  0 816 574 A1  1/1998
GB  1 198 409     7/1970

OTHER PUBLICATIONS

International Search Report and Written Opinion for International Appl. No. PCT/EP2009/056192, European Patent Office, mailed on Nov. 18, 2009, 14 pages.
Communication pursuant to Article 94(3) EPC for EP Appl. No. 09 749 889.2, European Patent Office, mailed Oct. 28. 2014.

*Primary Examiner* — Frederick L Lagman
*Assistant Examiner* — Carib Oquendo
(74) *Attorney, Agent, or Firm* — Sterne, Kessler, Goldstein & Fox P.L.L.C.

(57) ABSTRACT

A method of laying underwater pipelines in the bed of a body of water, the method including laying an underwater pipeline along a given path on the bed of the body of water; breaking up a ground mass along the path to a given depth in the bed; and fluidifying the broken ground mass beneath the underwater pipeline to sink the underwater pipeline into the fluidified ground mass.

21 Claims, 8 Drawing Sheets

(51) Int. Cl.
*E02F 5/04* (2006.01)
*E02F 5/14* (2006.01)
*E02F 9/28* (2006.01)
*F16L 1/028* (2006.01)
*F16L 1/16* (2006.01)

(56) References Cited

U.S. PATENT DOCUMENTS 4,714,378 A * 12/1987 Lincoln .................. 405/163
5,639,185 A *  6/1997 Saxon .................... 405/163

* cited by examiner

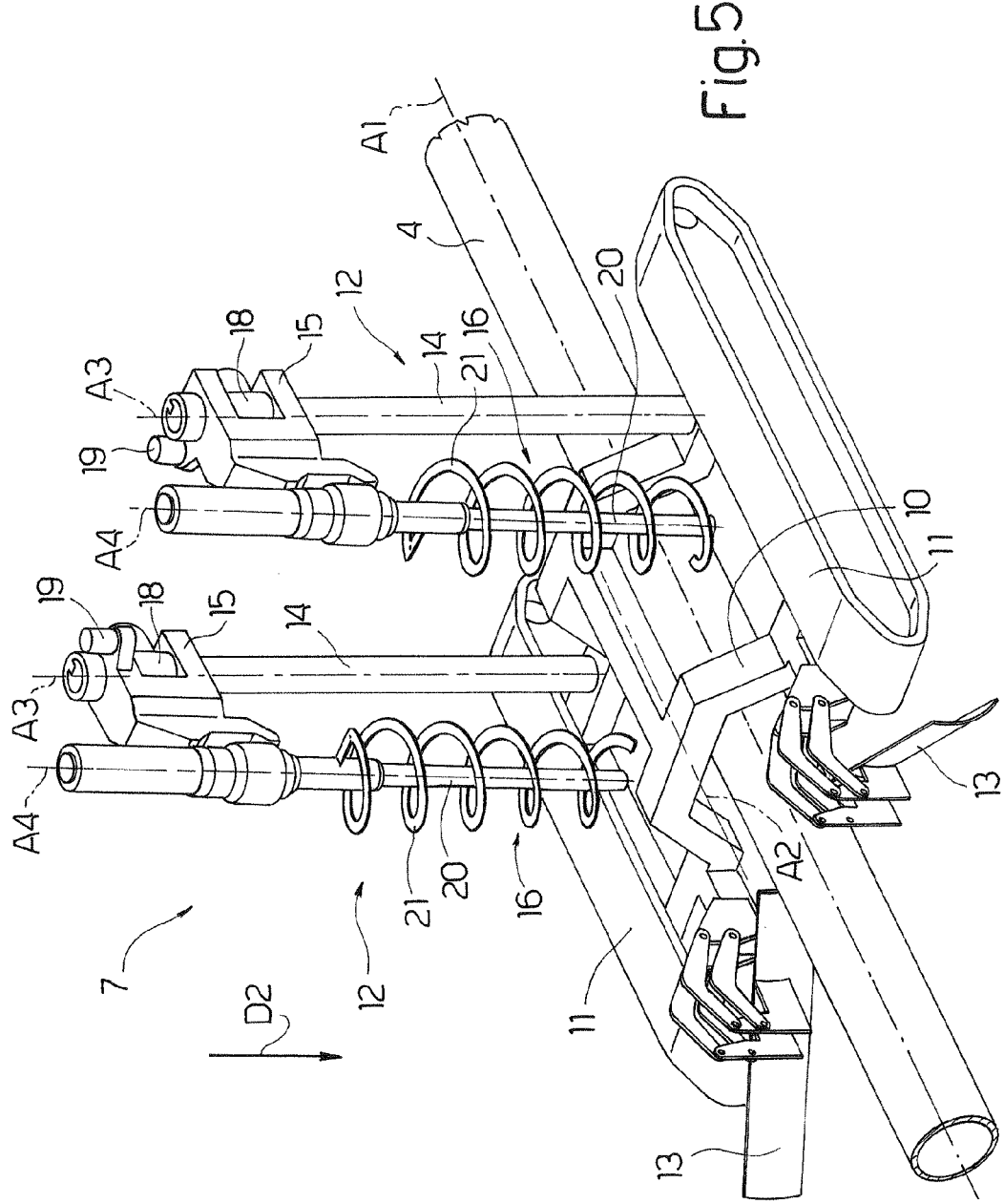

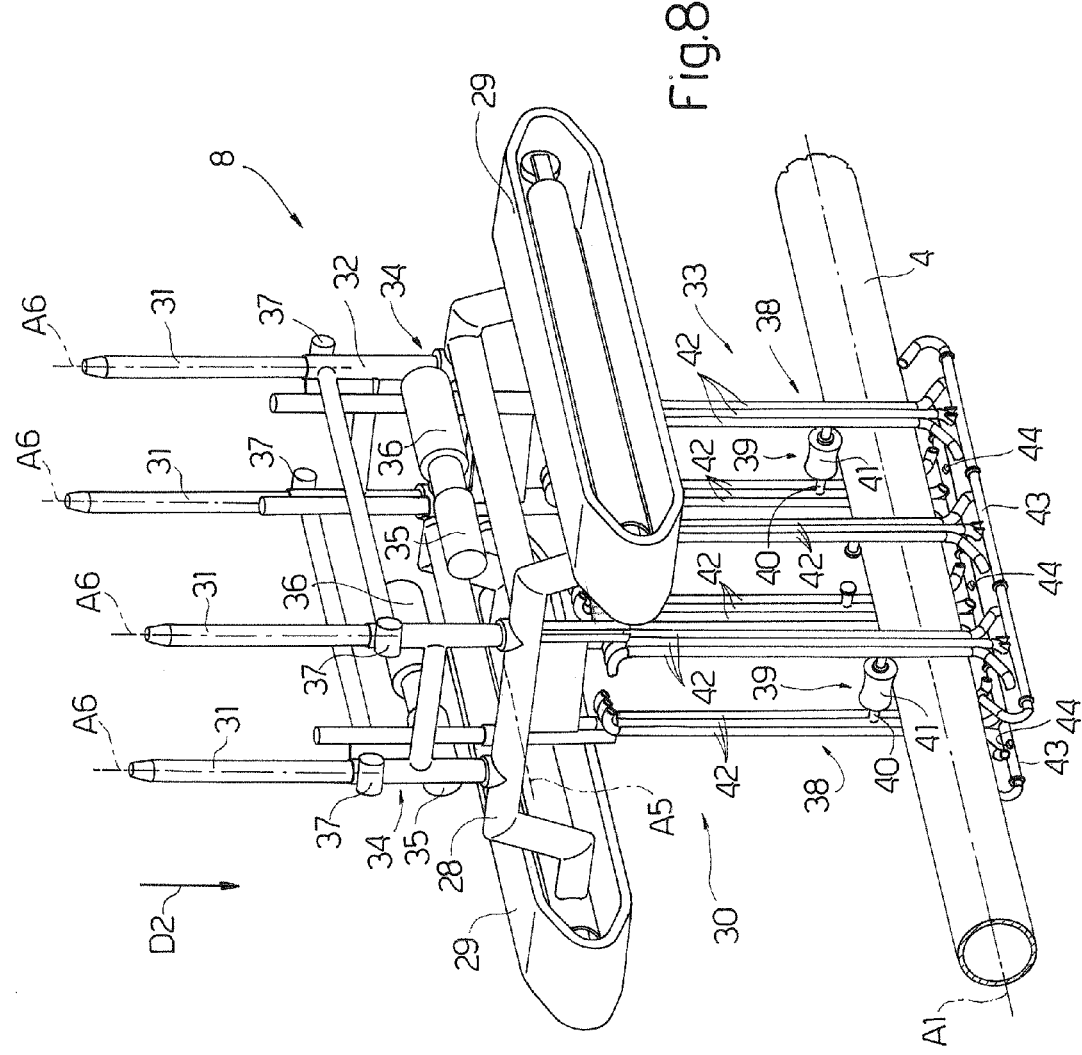

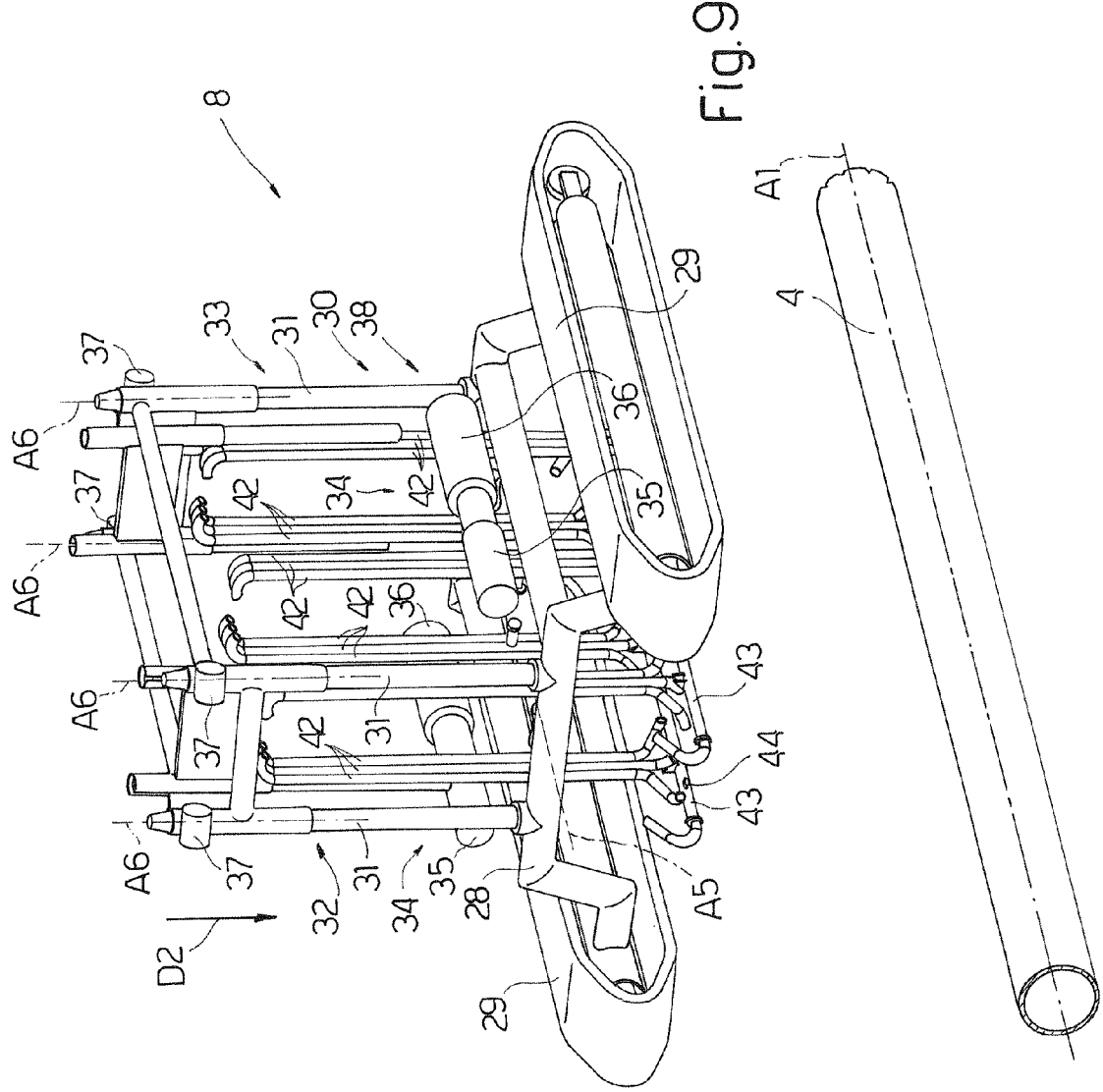

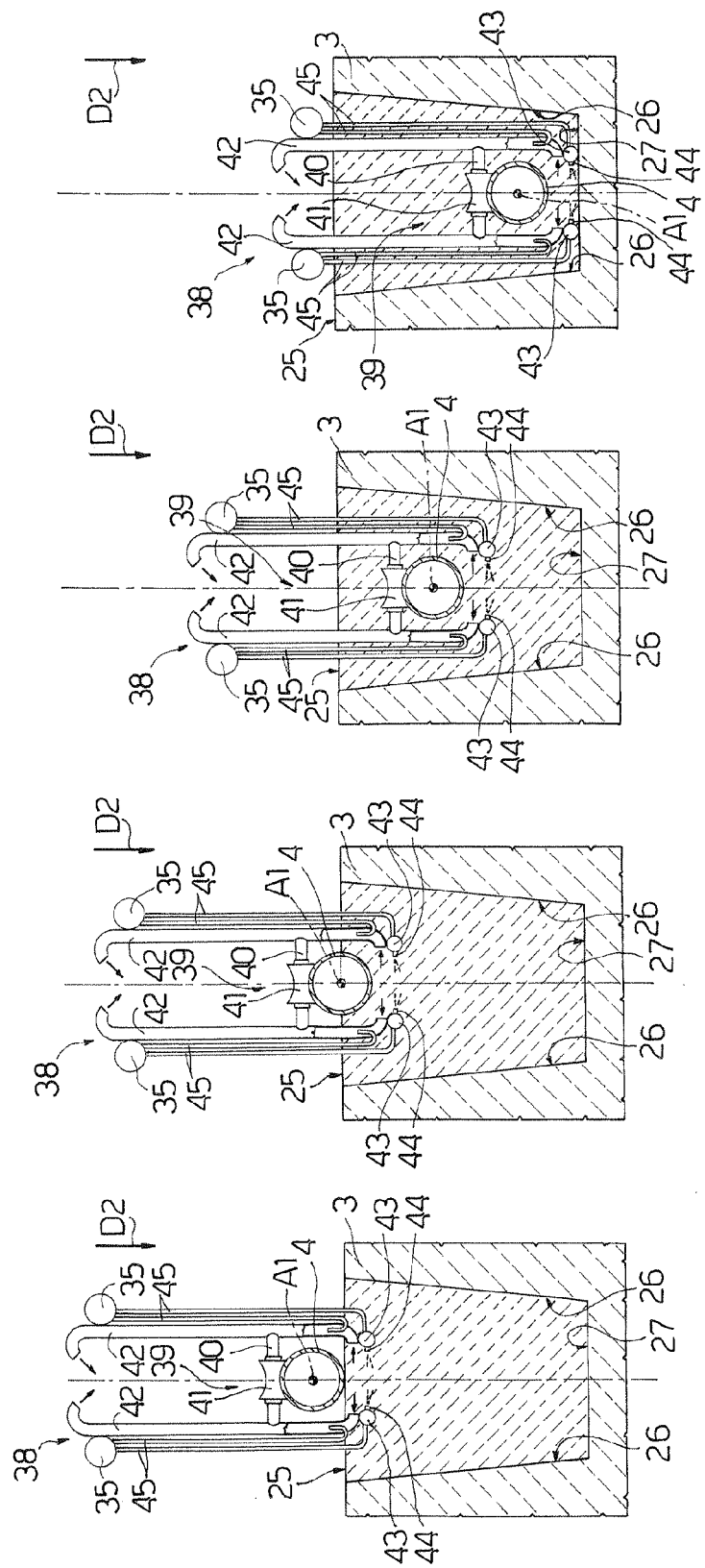

METHOD AND SYSTEM OF LAYING UNDERWATER PIPELINES IN THE BED OF A BODY OF WATER

TECHNICAL FIELD

The present invention relates to a method of laying underwater pipelines in the bed of a body of water.

BACKGROUND ART

In-bed laying underwater pipelines is commonly known as "underground laying", and comprises laying the pipeline along a given path on the bed of the body of water; breaking up a ground mass along the path to a given depth; digging a trench or generally removing the broken ground mass, which normally coincides with the ground-breaking stage; and possibly burying the pipeline.

More specifically, currently used known techniques comprise removing the broken ground mass to form a trench in the bed of the body of water; and lowering the pipeline into the trench. The pipeline may later be covered over with the removed ground mass to fill in the trench and bury the pipeline.

Underwater pipelines carrying hydrocarbons are normally laid completely or partly underground for various reasons, some of which are discussed below. Underwater pipelines are normally laid underground close to shore approaches, in relatively shallow water, to protect them from damage by blunt objects, such as anchors or nets, and are sometimes laid underground to protect them from natural agents, such as wave motion and currents, which may result in severe stress. That is, when a pipeline is laid on the bed of a body of water, it may span two supporting areas of the bed, i.e. a portion of the pipeline may be raised off the bed; in which case, the pipeline is dangerously exposed to, and offers little resistance to the movements induced by, wave motion and currents. Underground laying may also be required for reasons of thermal instability, which result in deformation (upheaval/lateral buckling) of the pipeline, or to protect the pipeline from the mechanical action of ice, which, in very deep water, may result in scouring of the bed.

To avoid damage, the pipeline often need simply be laid at the bottom of a suitably deep trench dug before laying (pre-trenching) or more often after laying the pipeline (post-trenching). At times, the protection afforded by the trench and eventual natural backfilling of the trench is not enough, and the pipeline must be buried using the broken ground mass removed from the trench, or any available ground mass alongside the trench.

The depth of the trench is normally such that the top line of the pipeline is roughly a meter below the surface of the bed, though severe environmental conditions may sometimes call for deeper trenches (of several meters). Trenching and backfilling are performed using digging equipment, and post-trenching (with the pipeline already laid on the bed) is the normal practice, to dig and backfill the trench in one go.

A first method of underground laying underwater pipelines is described in Patent Application WO 2005/005736. This is a post-trenching method comprising the steps of breaking up a ground mass in the bed to open the way; and drawing a huge plough along the opening to form a trench in which to lower the pipeline.

A second method of underground laying underwater pipelines is described in Patent Application WO 2004/016366, in which the method comprises breaking up a ground mass in the bed; clearing a trench using pumps installed on a support vessel; lowering the pipeline into the trench; and filling the trench using the pumps on the support vessel. In other words, the mass of broken material is first sucked out and then released, downstream from the suction area, by the pumps on the support vessel; and the trench extends between the suction area and the release area.

Both the above methods have the drawback of being highly energy-intensive, though for different reasons. And, in both cases, energy consumption increases exponentially alongside an increase in trench depth.

DISCLOSURE OF INVENTION

One object of the present invention is to provide a method designed to eliminate the drawbacks of the known art.

Another object of the present invention is to provide a method designed to minimize energy consumption, particularly when underground laying at considerable depth.

According to the present invention, there is provided a method of laying underwater pipelines in the bed of a body of water, the method comprising the steps of laying an underwater pipeline along a given path on the bed of the body of water; breaking up a ground mass along said path to a given depth; and fluidifying the broken ground mass beneath the underwater pipeline to sink the underwater pipeline into the fluidified ground mass, wherein the broken ground mass comprises adjacent ground particles, and the step of fluidifying the broken ground mass comprises maintaining hydrodynamic suspension of said ground particles in the water in a first area beneath the underwater pipeline.

The present invention provides for minimizing the ground mass to be transferred, and the distance it has to be transferred, by eliminating the need to dig a trench. Moreover, part of the fluidified ground mass is moved by the underwater pipeline itself as it sinks.

The present invention also relates to a system for laying underwater pipelines in the bed of a body of water.

According to the present invention, there is provided a system for laying underwater pipelines in the bed of a body of water, the system comprising laying means for laying an underwater pipeline along a given path; breaking means for breaking up a ground mass along said path to a given depth; and fluidifying means for fluidifying the broken ground mass beneath the underwater pipeline to sink the underwater pipeline into the fluidified ground mass; wherein the broken ground mass comprises adjacent ground particles, and the fluidifying means are configured for maintaining hydrodynamic suspension of said ground particles in the water in a first area beneath the underwater pipeline.

BRIEF DESCRIPTION OF THE DRAWINGS

A non-limiting embodiment of the present invention will be described by way of example with reference to the accompanying drawings, in which:

FIGS. 5 and 6 show views in perspective, with parts removed for clarity, of a ground-working vehicle in different operating configurations with respect to an underwater pipeline;

FIGS. 8 and 9 show views in perspective, with parts removed for clarity, of a burying vehicle in different operating configurations with respect to an underwater pipeline;

FIGS. 10A to 10D show front sections, with parts removed for clarity, of successive steps in sinking the underwater pipeline.

BEST MODE FOR CARRYING OUT THE INVENTION LAYING THE UNDERWATER PIPELINE

Figure 1:
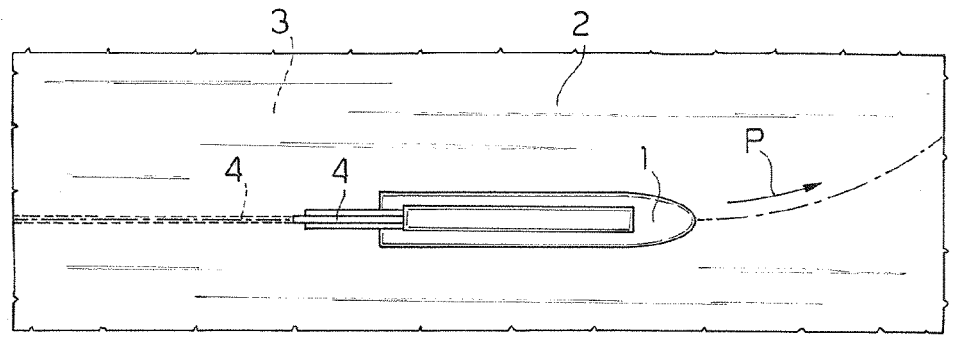
FIGS. 1 and 2 show simplified plan views of an underwater-pipeline laying vessel at respective stages in laying an underwater pipeline using the method according to the present invention.

Number 1 in FIG. 1 indicates a laying vessel, which advances in a body of water 2 to lay an underwater pipeline 4 along a given path P on the bed 3 of the body of water 2.

In the following description, the term "body of water" is intended to may any stretch of water, such as sea, ocean, lake, etc., and the term "bed" is intended to mean the concave layer of the earth's crust containing the mass of water in the body.

Underwater pipeline 4 is eventually to be laid in, i.e. beneath the surface of, bed 3, so the method according to the invention comprises breaking up a ground mass along path P; and locally fluidifying the broken ground mass of bed 3 beneath underwater pipeline 4 to a given depth, so as to sink underwater pipeline 4 into the fluidified ground mass.

In FIG. 1, underwater pipeline 4 is laid before breaking up the ground mass of bed 3.

Figure 2:
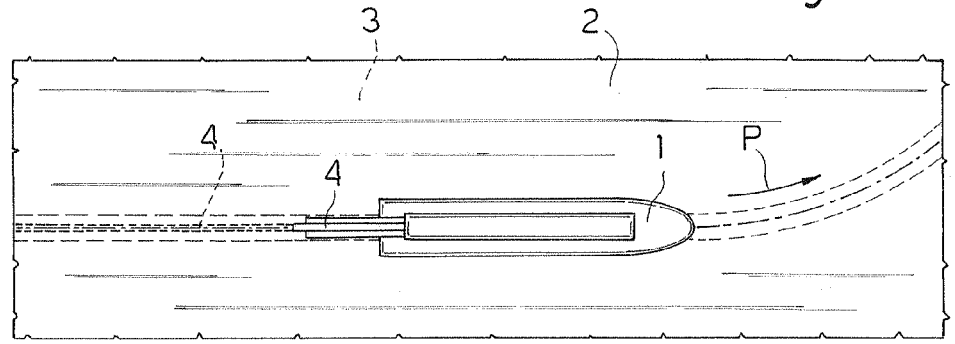

In FIG. 2, the ground mass is first broken up along path P, and underwater pipeline 4 is then laid on bed 3, more specifically on the broken ground mass.

When underwater pipeline 4 is laid before the ground-breaking stage, as shown in FIG. 1, the broken ground mass is fluidified as soon as it is broken up; whereas, when underwater pipeline 4 is laid after the ground-breaking stage, as shown in FIG. 2, underwater pipeline 4 is laid between the ground-breaking and fluidifying stages.

In the following detailed description, specific reference is made to the FIG. 1 mode, though the method according to the present invention applies to both.

Laying the Underwater Pipeline in the Bed of the Body of Water

Figure 3:
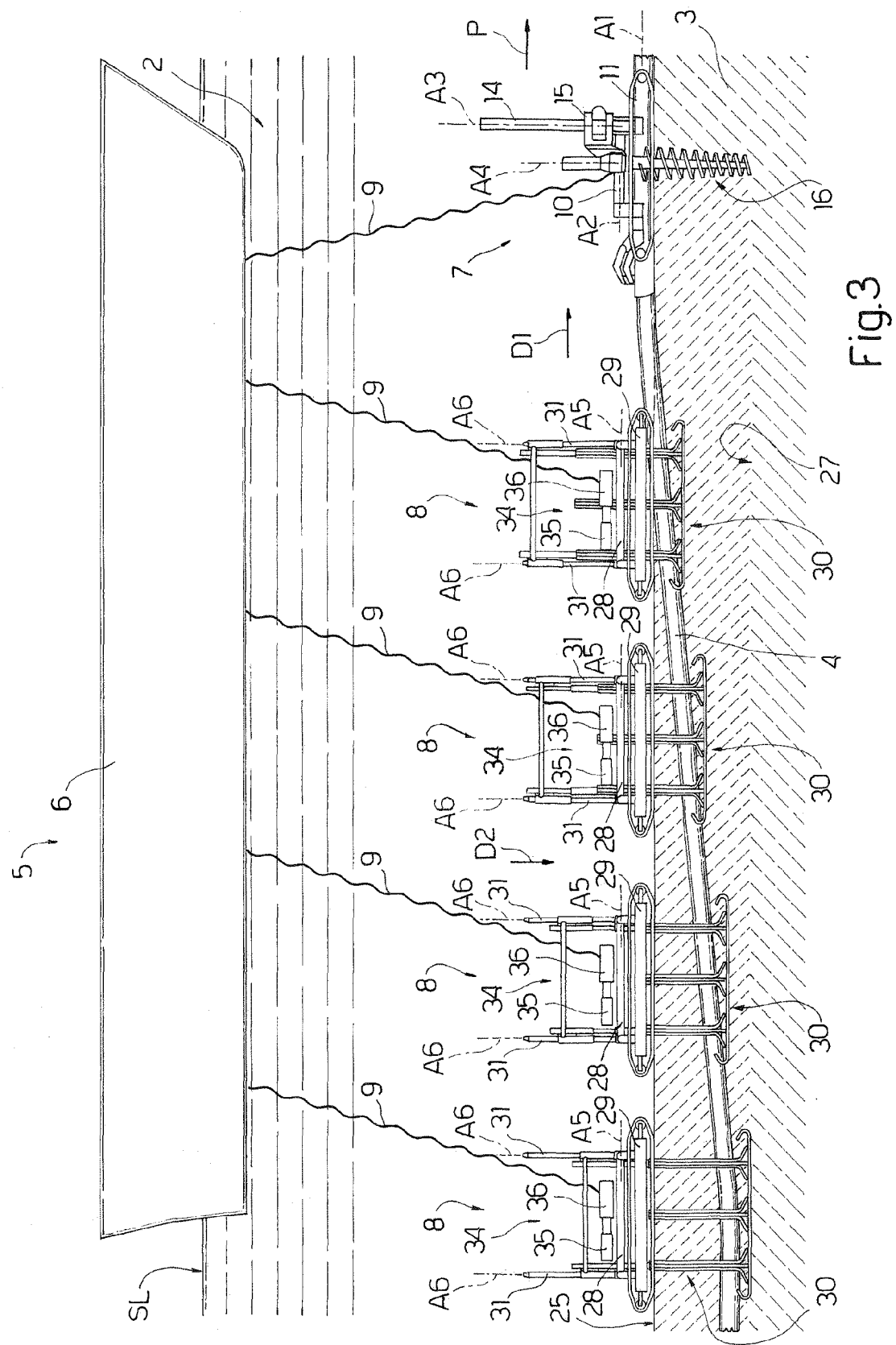
FIG. 3 shows a partly sectioned side view, with parts removed for clarity, of one step in laying an underwater pipeline in the bed of a body of water in accordance with the present invention.

Number 5 in FIG. 3 indicates part of a system for laying underwater pipelines in bed 3 of body of water 2. Laying system 5 also comprises the laying vessel 1 shown in FIGS. 1 and 2. With reference to FIG. 3, laying system 5 comprises a support vessel 6; a ground-working vehicle 7; and a number of burying vehicles 8.

Vehicles 7 and 8 are underwater vehicles that can be guided along path P. Support vessel 6 serves to guide vehicles 7 and 8 along path P and to supply vehicles 7 and 8 with electrical power, control signals, compressed air, hydraulic power, etc. Accordingly, each of vehicles 7 and 8 is connected to support vessel 6 by a bundle of cables 9, and is moved along path P in a traveling direction D1.

In the FIG. 3 example, laying system 5 comprises a train in turn comprising a ground-working vehicle 7, and four burying vehicles 8 in line behind ground-working vehicle 7. Vehicles 7 and 8 are moved in traveling direction D1 along path P, and are located over underwater pipeline 4.

The number of burying vehicles 8 depends on how deep (measured with respect to the level of bed 3) underwater pipeline 4 is to be laid; the greater the depth, the greater the number of burying vehicles 8.

Figure 6:
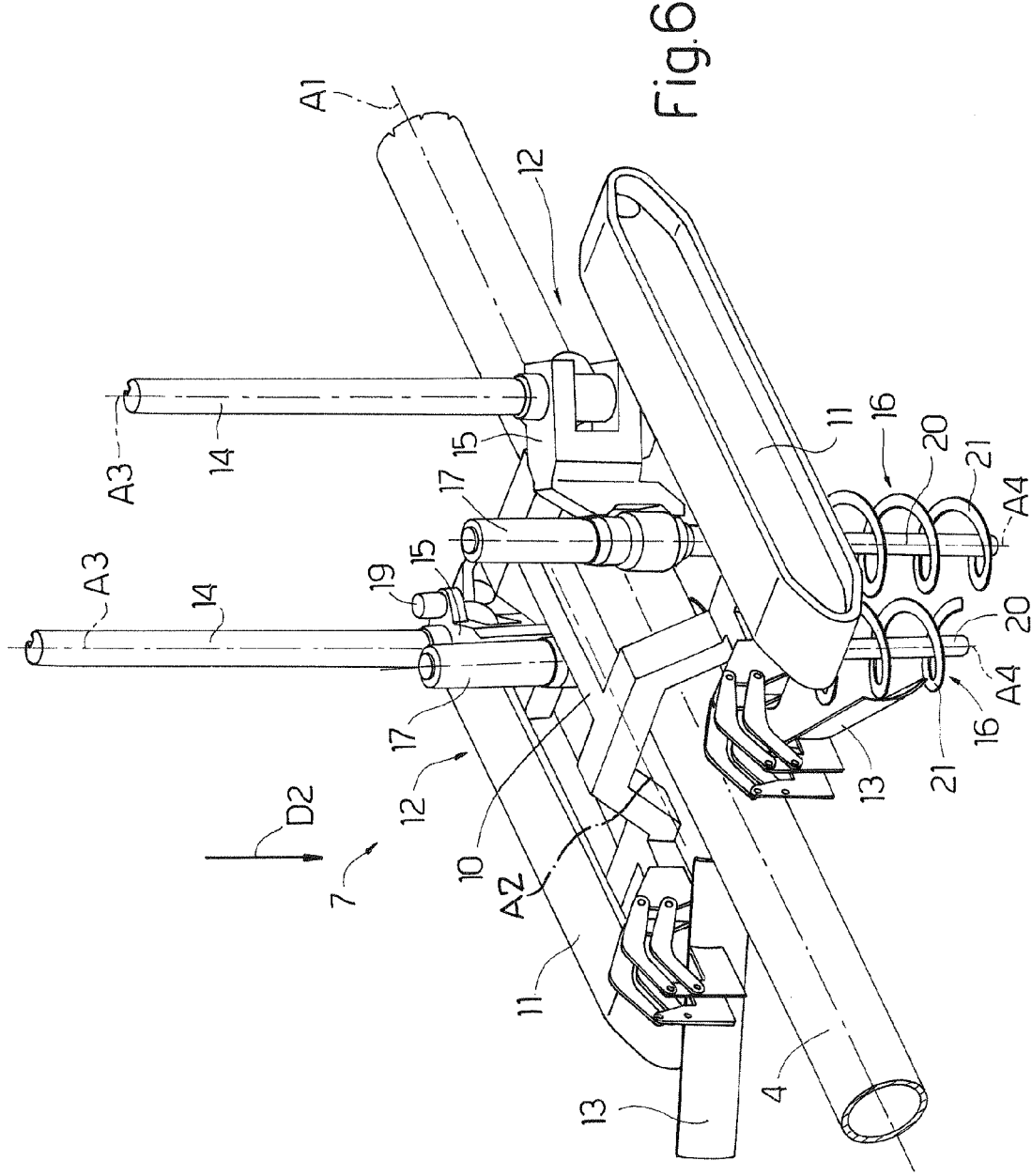

With reference to FIGS. 5 and 6, underwater pipeline 4 extends along an axis A1; and ground-working vehicle 7 extends along an axis A2, and comprises a saddle-type frame 10 that straddles underwater pipeline 4 (FIG. 4) and supports two propulsion devices 11—in the example shown, powered tracks parallel to axis A2 and which are positioned on opposite sides of underwater pipeline 4 and rest on bed 3 (FIG. 3). Frame 10 supports two ground-working units 12; and two scraper blades 13 for scraping the surface of bed 3 on opposite sides of underwater pipeline 4 once the ground mass is broken up.

Figure 4:
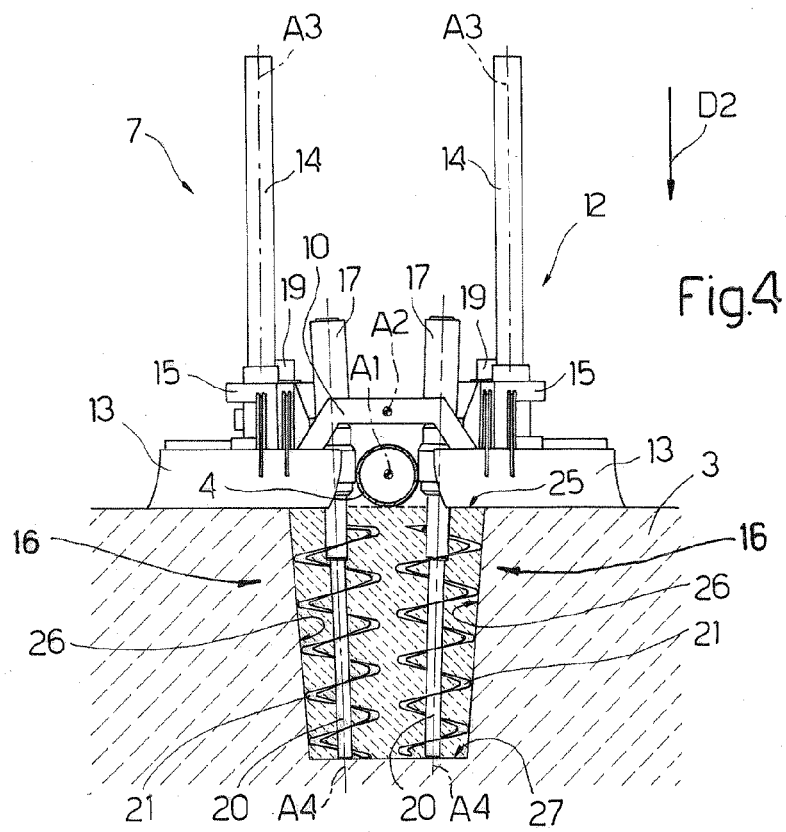
FIG. 4 shows a partly sectioned rear view, with parts removed for clarity, of a ground-breaking step in the method according to the present invention.

With reference to FIG. 4, each ground-working unit 12 comprises a runner 14 fixed to frame 10 and extending along an axis A3 perpendicular to axis A2 and, in use, substantially perpendicular to bed 3; a slide 15 fitted to runner 14 and movable selectively along and about axis A3; a ground-working tool 16 fitted to slide 15 and extending downwards along an axis A4 sloping slightly with respect to axis A3; and a motor 17 for rotating tool 16 about axis A4 and with respect to slide 15.

In FIG. 5, tools 16 are shown raised and spaced apart; in FIGS. 4 and 6, tools 16 are shown lowered, close together, into the ground. The slight slope of axes A4 with respect to axes A3 is shown more clearly in FIG. 4, which shows axes A4 actually converge.

With reference to FIGS. 5 and 6, each slide 15 is moved along respective runner 14 by an actuator 18, and about respective runner 14 by an actuator 19, to adjust the position of ground-working tools 16.

Figure 7:
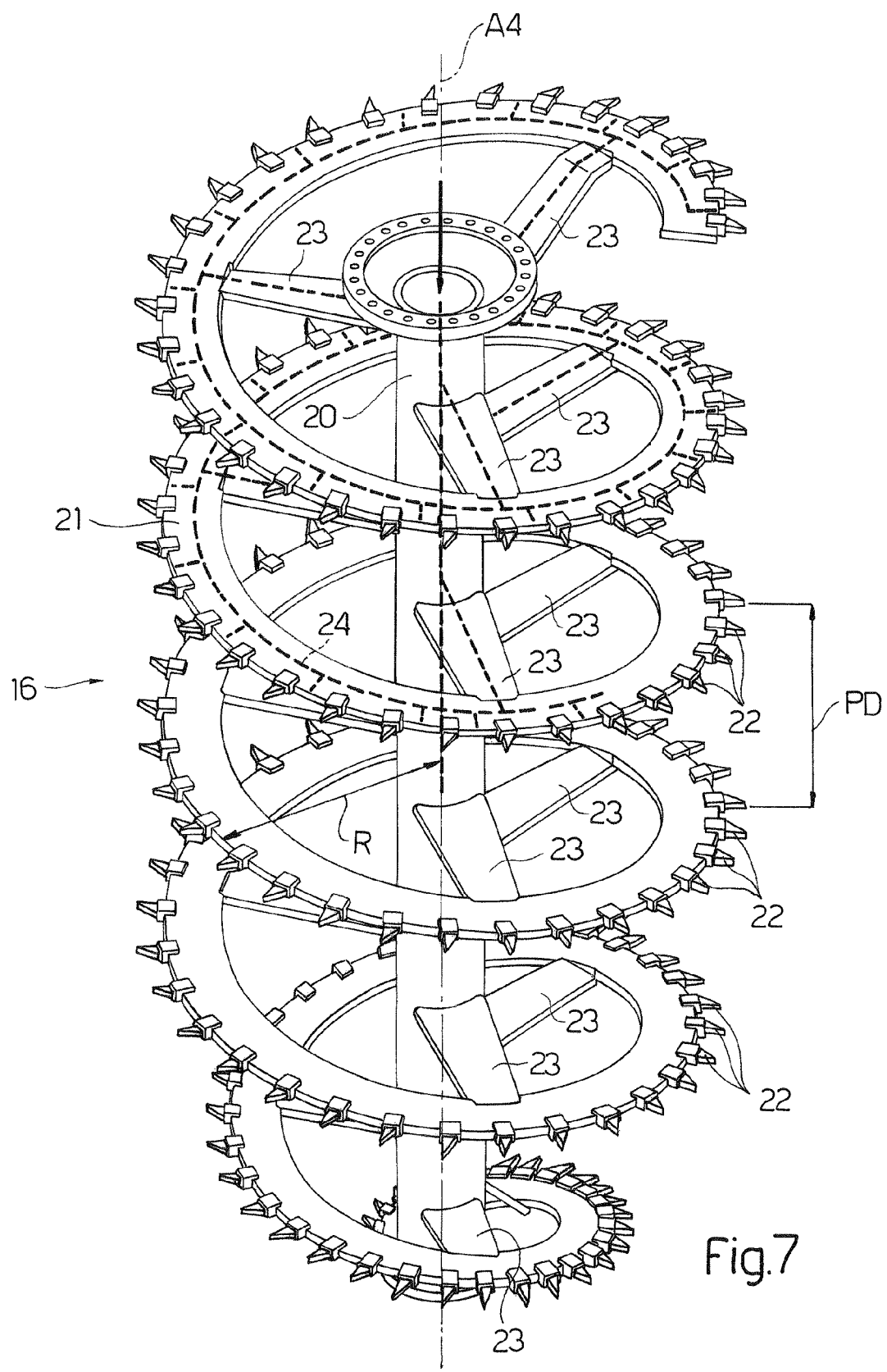
FIG. 7 shows a larger-scale view in perspective, with parts removed for clarity, of a detail of the FIGS. 5 and 6 vehicle.

With reference to FIG. 7, each tool 16 is designed to break up any type of terrain, including clayey and rocky terrain, and comprises a central shaft 20 extending along axis A4; a blade 21 coiling about axis A4 with a constant radius R from slide 15 to the free end of tool 16, and with the last turn, close to the free end, decreasing slightly in radius with respect to radius R; teeth 22 made of hard material and equally spaced along blade 21; and arms 23 connecting shaft 20 to blade 21.

The pitch PD of the spiral of blade 21 is constant, and the ratio between pitch PD and twice radius R, i.e. the diameter, of the spiral ranges between 0.2 and 0.9 and preferably between 0.4 and 0.5. The ratio considered best is 0.45. The ratios mentioned improve the cutting action, as opposed to the scraping action, of blade 21, and so reduce the energy required, even when working clayey terrain, and minimize the amount of terrain removed by blade 21. They also enable simultaneous engagement of a larger number of turns, and therefore of teeth 22, per unit of length along axis A4.

Each tool 16 comprises a lubricating circuit 24 extending along shaft 20, blade 21, and arms 23, and which comprises a water supply pump (not shown), and terminates in nozzles (not shown) arranged along blade 21, at teeth 22, to lubricate blade 21 and teeth 22. Lubrication is particularly necessary when using tool 16 in clayey terrain, which tends to stick to blade 21 and teeth 22. The lubricating water is dispersed into the broken ground, and so assists in impregnating the broken ground mass with water and, hence, the later fluidifying stage.

With reference to FIG. 4, a gap is left between each slide 15 and respective blade 21, so slide 15 can be rotated about runner 14 to position blade 21, and break up the ground, directly beneath underwater pipeline 4.

With reference to FIG. 4, ground-working tools 16 break up a ground mass located directly beneath underwater pipeline 4, extending along path P, and substantially prismatic in shape. The broken ground mass has a main face 25 on a level with bed 3 and of a width preferably ranging between two and four times the width of underwater pipeline 4; two almost vertical, slightly converging lateral faces 26; and a bottom face 27 slightly narrower than main face 25.

With reference to FIGS. 8 and 9, each burying vehicle 8 extends along an axis A5, and comprises a saddle-type frame 28 which, if needed, can be positioned astride underwater pipeline 4; two propulsion devices 29—in the example shown, two powered tracks that can be positioned on opposite sides of underwater pipeline 4; and a burying device 30.

Burying device 30 comprises four runners 31, each fixed to frame 28 and extending along an axis A6 perpendicular to axis A5 and, in use, perpendicular to bed 3 (FIG. 3); a slide 32 movable along runners 31 in a direction D2 parallel to axis A6; a fluidifier 33 for fluidifying the broken ground mass; and two pump assemblies 34, each fixed to frame 28 and comprising a pump 35, preferably a centrifugal pump with an elongated draw pipe (not shown) for drawing clean water, and an electric motor 36 for powering respective pump 35. Fluidifier 33 is fixed to slide 32 and movable with it in direction D2.

More specifically, slide 32 is connected to runners 31 by powered mechanisms 37 for adjusting the position of slide 32 in direction D2 with respect to frame 28, and hence the depth of fluidifier 33 in the broken ground mass, as shown more clearly in FIG. 3, in which the depth of respective fluidifiers 33 of the burying vehicles 8 in the train decreases in traveling direction D1. The positions of fluidifiers 33 in the drawings are purely indicative, and the ideal position is determined by adjusting the position of slides 32.

With reference to FIGS. 8 and 9, fluidifier 33 comprises two tubular structures 38, which are placed on opposite sides of underwater pipeline 4, as shown in FIG. 8, and are connected by thrusters 39 which push underwater pipeline 4 downwards in direction D2 to assist sinking of underwater pipeline 4 into the fluidified ground mass. In the example shown in the drawings, thrusters 39 are in the form of bars 40 fitted with rollers 41, which are placed on the top of underwater pipeline 4.

With reference to FIGS. 8 and 9, each tubular structure 38 comprises a number of tubes 42 parallel to axis A6; and a tube 43 parallel to axis A4 and connected to the far ends of tubes 42. The ends of tube 43 are bent to assist tube 43 in penetrating the broken ground mass in traveling direction D1.

The top end of each tube 42 is bent (downwards) into a U, and the bottom end of each tube 42 of one tubular structure 38 is bent to face the opposite tubular structure 38.

Each tube 42 is slightly longer than the depth of the broken ground mass; tubes 42 and 43 of each tubular structure are fed with pressurized water by a respective pump 35; each tube 43 of one tubular structure 38 has nozzles 44 facing the nozzles 44 of tube 43 of the opposite tubular structure 38; and each tube 42 is fed by one of pumps 35 with an upward jet of water, so that the jet combination, the jet direction, and each tube 42 form a so-called ejection pump, in which the suction end is defined by the bottom mouth of tube 42, and the delivery end is defined by the top mouth of tube 42.

With reference to FIGS. 10A-10D, tubes 42 and 43 are connected to respective pumps 35 by hoses 45. The combined action of the water jets from nozzles 44 of tubes 43, and of suction through the bottom mouths of tubes 42 fluidifies the broken ground mass directly beneath underwater pipeline 4, and aids in sinking underwater pipeline 4. By adjusting the depth of fluidifier 33, the area directly beneath underwater pipeline 4 can be fluidified locally.

More specifically, fluidifying the broken ground mass as described above reduces support of the pipeline by the broken ground mass beneath underwater pipeline 4, and increases the broken ground mass over underwater pipeline 4 along a portion of path P (FIG. 3) of substantially the same length as the active part of fluidifier 33.

When the area beneath underwater pipeline 4 is no longer capable of supporting the pipeline along said path portion, underwater pipeline 4 sinks and itself forces part of the broken ground mass upwards. As a result, the amount of broken ground mass transferred by direct energy use is reduced to the minimum required to partly sink underwater pipeline 4, and is less than the total broken ground mass. Moreover, the broken ground mass actually transferred is only transferred a very small distance substantially equal to the length of tubes 42, i.e. slightly more than the maximum depth of the broken ground mass; and part of the broken ground mass is transferred, not by suction of the fluidified ground mass, but by sinking of underwater pipeline 4.

In other words, the ground mass transferred by tubes 42 is only a small part of the overall broken ground mass, and, discounting the traveling speed of the train in direction D1, displacement of the ground mass in traveling direction D1 is substantially nil.

Variations

In the example described with reference to the drawings, fluidification to assist sinking the underwater pipeline is achieved by a combination of water jets and hydrodynamic suction beneath the pipeline. This is the best method of implementing the present invention, and gives excellent results, regardless of the type of terrain. In possible variations of the method, the effectiveness of which depends on the type of terrain, the broken ground mass is fluidified using pressurized-water jets only, or solely by hydrodynamic suction.

The basic principle is to reduce the consistency of the broken ground mass, so the resulting particles of the broken ground mass are suspended in the water, at least beneath the underwater pipeline, to form at least a limited area in which to sink the pipeline.

The pipeline, in fact, is sunk locally and along a path portion of the same length as the fluidifier in traveling direction D1.

In another variation, the ground-working and burying vehicles are manned, as opposed to controlled from the support vessel.

Advantages

The present invention has numerous advantages, one of which lies in the ground-working tool minimizing the amount of material to be moved and so reducing energy consumption as described above.

Moreover, as stated, the pipeline is sunk by simply moving the mass of ground material necessary to cause it to sink, thus minimizing energy consumption.

In addition, it should be pointed out that a trench is never actually dug, which means most of the broken ground mass is not raised above bed level. This prevents the sidewalls from collapsing when working in loose bed material, and also has the advantage of enabling break-up of relatively narrow cross section ground masses (of two to four times the diameter of the underwater pipeline), thus saving energy, by only having to break up a relatively small ground mass, and also eliminating the need for lateral supporting walls.

The invention claimed is:

1. A method of laying underwater pipelines in a bed of a body of water, the method comprising the steps of:
    laying an underwater pipeline along a given path on the bed of the body of water;

breaking up a ground mass in the bed along said path by using two ground-working tools; and fluidifying the broken ground mass beneath the underwater pipeline to sink the underwater pipeline into the fluidified ground mass;

wherein the broken ground mass comprises adjacent ground particles, and wherein the step of fluidifying the broken ground mass comprises maintaining hydrodynamic suspension of said adjacent ground particles in the water in a first area beneath the underwater pipeline;

wherein the maintaining hydrodynamic suspension of said adjacent ground particles in the water in the first area beneath the underwater pipeline comprises:

spraying a number of jets of water into the broken ground mass in the first area beneath the underwater pipeline;

hydraulically sucking part of the broken ground mass from the first area beneath the underwater pipeline;

transferring said part of the broken ground mass to a second area over the underwater pipeline and the first area to assist burying the underwater pipeline under a ground layer; and wherein a majority of the broken ground mass is not raised above the bed of the body of water.

2. The method as claimed in claim 1, wherein the step of fluidifying the broken ground mass is performed simultaneously along a continuous portion of said path.

3. The method as claimed in claim 1, wherein the step of laying the underwater pipeline on the bed precedes the step of breaking up the ground mass.

4. The method as claimed in claim 3, wherein the step of fluidifying the broken ground mass succeeds the step of breaking up the ground mass.

5. The method as claimed in claim 1, wherein the step of breaking up the ground mass precedes the step of laying the underwater pipeline.

6. The method as claimed in claim 1, wherein the step of fluidifying the broken ground mass comprises spraying a jet of water into the broken ground mass in the first area beneath the underwater pipeline.

7. The method as claimed in claim 1, comprising the step of pushing the underwater pipeline down into the fluidified ground mass.

8. A system for laying an underwater pipeline in a bed of a body of water along a given path, the system comprising:

two ground-working tools for breaking up a ground mass in the bed along said path beneath the pipeline; and a burying vehicle comprising:
at least one pump; and
a fluidifier for fluidifying the broken ground mass beneath the underwater pipeline to sink the underwater pipeline into the fluidified ground mass, the fluidifier comprising
nozzles for directing jets of water into the broken ground mass in a first area beneath the underwater pipeline, and
at least two tubes positioned on opposite sides of the underwater pipeline and having bent outlets directed downward and towards the underwater pipeline, each tube being configured to suck part of the broken ground mass from the first area beneath the underwater pipeline, and transfer said part of the broken ground mass to a second area over the underwater pipeline and the first area;

wherein the broken ground mass comprises adjacent ground particles; and wherein the fluidifier is configured for maintaining hydrodynamic suspension of said adjacent ground particles in the water in the first area beneath the underwater pipeline and configured such that a majority of the broken ground mass is not raised above the bed of the body of water.

9. The system as claimed in claim 8, wherein each ground-working tool comprises a shaft rotating about a respective axis of rotation; and a blade extending about the shaft in a spiral having a pitch and a radius.

10. The system as claimed in claim 9, wherein the ratio between the pitch and twice the radius ranges between 0.2 and 0.9.

11. The system as claimed in claim 10, wherein the ratio between the pitch and twice the radius ranges between 0.4 and 0.5.

12. The system as claimed in claim 11, wherein the ratio between the pitch and twice the radius is 0.45.

13. The system as claimed in claim 9, characterized in that each ground-working tool comprises a number of teeth made of hard material and spaced along the blade; and a lubricating circuit extending along the shaft and the blade to lubricate the blade and said teeth.

14. The system as claimed in claim 8, wherein the burying vehicle further comprises a powered mechanism for adjusting the depth of the fluidifier in the broken ground mass.

15. The system as claimed in claim 8, wherein the nozzles are divided into two sets of facing nozzles for directing respective jets of water into the first area beneath the underwater pipeline.

16. The system as claimed in claim 8, wherein said at least one pump is connected to at least one tube of the at least two tubes and forms an upward jet in the at least one tube of the at least two tubes, so the jet combines with the at least one tube of the at least two tubes to form an ejection pump.

17. The system as claimed in claim 8, wherein each tube is slightly longer than a depth of the broken ground mass.

18. The system as claimed in claim 8, wherein the burying vehicle further comprises thrusters for pushing the underwater pipeline into the fluidified ground mass to assist sinking the underwater pipeline.

19. The system as claimed in claim 8, further comprising a number of burying vehicles arranged successively in a train moving in a traveling direction along said path;

wherein the respective fluidifiers of said burying vehicles are positioned, in the broken ground mass, at respective depths decreasing in the traveling direction of the train.

20. A system for laying an underwater pipeline in a bed of a body along a given path, the system comprising:

a burying vehicle comprising:
at least one pump; and
a fluidifier comprising nozzles for directing jets of water into a broken ground mass in a first area beneath the underwater pipeline and at least two tubes positioned on opposite sides of the underwater pipeline and having bent top ends directed towards the underwater pipeline and towards an opposing tube of the at least two tubes, each tube being configured to suck part of the broken ground mass from the first area beneath the underwater pipeline, and transfer said part of the broken ground mass to a second area over the underwater pipeline and the first area for fluidifying the broken ground mass beneath the underwater pipeline to sink the underwater pipeline into the fluidified ground mass;

wherein a majority of the broken ground mass is not raised above the bed of the body of water.

21. A system for laying an underwater pipeline in a bed of a body along a given path, the system comprising:
  a burying vehicle comprising:
    at least one pump; and
    a fluidifier comprising:
      nozzles for directing jets of water into a broken ground mass in a first area beneath the underwater pipeline; and
      a first set of tubes and a second set of tubes positioned on an opposite side of the underwater pipeline from the first set of tubes, each tube of the first set of tubes and the second set of tubes having a bottom end for sucking part of the broken ground mass from the first area beneath the underwater pipeline, and transferring said part of the broken ground mass to a second area over the underwater pipeline and the first area through a top end bent downward and towards the underwater pipeline into a U for fluidifying the broken ground mass beneath the underwater pipeline and sinking the underwater pipeline into the fluidified ground mass.

* * * * *